(12) United States Patent
Holsey

(10) Patent No.: US 7,454,863 B1
(45) Date of Patent: Nov. 25, 2008

(54) BOBBER INCORPORATING FISHING LINE HANDLING ASSEMBLY

(76) Inventor: Bobbie D. Holsey, 5 Rhonda Cir., Hampton, VA (US) 23669

( * ) Notice: Subject to any disclaimer, the term of this patent is extended or adjusted under 35 U.S.C. 154(b) by 0 days.

(21) Appl. No.: 12/011,917

(22) Filed: Jan. 30, 2008

(51) Int. Cl.
*A01K 93/00* (2006.01)
(52) U.S. Cl. .................. 43/44.88; 43/44.87; 43/43.12
(58) Field of Classification Search ............ 43/44.88, 43/44.87, 44.9, 44.91, 43.13, 43.12, 43.15
See application file for complete search history.

(56) References Cited

U.S. PATENT DOCUMENTS

| | | | | |
|---|---|---|---|---|
| 786,597 | A * | 4/1905 | Picken | 43/43.15 |
| 813,153 | A * | 2/1906 | Johnson | 43/44.88 |
| 1,193,684 | A * | 8/1916 | Gregory et al. | 43/43.15 |
| 1,232,390 | A * | 7/1917 | Phillips | 43/44.88 |
| 1,489,088 | A * | 4/1924 | McMindes | 43/44.9 |
| 1,778,119 | A * | 10/1930 | Neville | 43/44.87 |
| 2,001,241 | A * | 5/1935 | De Vries | 43/44.9 |
| 2,014,517 | A * | 9/1935 | Beregow | 43/44.9 |
| 2,157,003 | A * | 5/1939 | Mussina | 43/42.74 |
| 2,181,458 | A * | 11/1939 | La Gue | 43/44.87 |
| 2,223,823 | A * | 12/1940 | Hampton | 43/44.9 |
| 2,283,779 | A * | 5/1942 | Winter | 43/43.13 |
| 2,315,048 | A * | 3/1943 | Croft | 43/44.9 |
| 2,374,752 | A * | 5/1945 | Johnson | 43/44.95 |
| 2,479,399 | A * | 8/1949 | Patten | 43/43.15 |
| 2,509,704 | A * | 5/1950 | Streitwieser | 43/43.12 |
| 2,596,269 | A * | 5/1952 | Metzger | 43/43.13 |
| 2,645,051 | A * | 7/1953 | Stofleth | 43/43.15 |
| 2,683,324 | A * | 7/1954 | Engelman | 43/42.74 |
| 2,693,049 | A * | 11/1954 | Atton | 43/44.9 |
| 2,712,194 | A * | 7/1955 | Di Stefano | 43/44.91 |
| 2,729,015 | A * | 1/1956 | Finnegan | 43/44.9 |
| 2,807,907 | A * | 10/1957 | Brite | 43/44.91 |
| 2,842,886 | A * | 7/1958 | Williams | 43/44.87 |
| 2,872,752 | A * | 2/1959 | Salzmann | 43/44.9 |
| 2,874,511 | A * | 2/1959 | Hettrick | 43/44.87 |
| 2,937,469 | A * | 5/1960 | Tiede | 43/44.88 |
| 2,952,937 | A * | 9/1960 | Wassing | 43/43.15 |
| 2,975,541 | A * | 3/1961 | Birrell | 43/43.15 |
| 2,992,508 | A * | 7/1961 | Schmidt | 43/44.91 |
| 3,019,546 | A * | 2/1962 | Hansen | 43/44.91 |
| 3,020,670 | A * | 2/1962 | Lockhart | 43/44.91 |
| 3,105,318 | A * | 10/1963 | Birrell | 43/44.87 |
| 3,273,278 | A * | 9/1966 | Lynch | 43/44.87 |
| 3,292,296 | A * | 12/1966 | Viveiros | 43/44.9 |
| 3,337,981 | A * | 8/1967 | Bowman | 43/44.91 |

(Continued)

FOREIGN PATENT DOCUMENTS

FR 2613905 A1 * 10/1988

(Continued)

*Primary Examiner*—Darren W Ark
(74) *Attorney, Agent, or Firm*—Peter J. Van Bergen

(57) ABSTRACT

A bobber includes a float and a fishing line handling assembly. The float has a passage extending therethrough from a first end of the float to a second end of the float, and the fishing line handling assembly is fitted in the passage. The assembly is terminated (i) at one end thereof by a downrigger release that extends from the passage at the first end of the float, and (ii) at an opposing end thereof by a snap clip that extends from the passage at the second end of the float.

19 Claims, 2 Drawing Sheets

U.S. PATENT DOCUMENTS

| | | | | |
|---|---|---|---|---|
| 3,392,475 | A * | 7/1968 | Vakousky, Jr. | 43/44.9 |
| 3,407,528 | A * | 10/1968 | Lenning | 43/43.13 |
| 3,443,336 | A * | 5/1969 | Reese | 43/44.88 |
| 3,455,056 | A * | 7/1969 | Cultrera | 43/44.91 |
| 3,613,289 | A * | 10/1971 | Wehren | 43/43.15 |
| 3,733,734 | A * | 5/1973 | Hysaw | 43/44.9 |
| 3,744,176 | A * | 7/1973 | Bondhus | 43/44.87 |
| 3,744,178 | A * | 7/1973 | Denny | 43/44.84 |
| 3,750,324 | A * | 8/1973 | Verheij | 43/44.88 |
| 3,798,825 | A * | 3/1974 | Popeli | 43/44.9 |
| 3,803,749 | A * | 4/1974 | Boyum | 43/44.9 |
| 3,897,649 | A * | 8/1975 | Jorgensen | 43/43.15 |
| 3,947,990 | A * | 4/1976 | Johnson | 43/43.15 |
| 4,008,539 | A * | 2/1977 | Gardner | 43/44.9 |
| 4,030,223 | A * | 6/1977 | Loesch et al. | 43/44.88 |
| 4,215,505 | A * | 8/1980 | Henze et al. | 43/44.9 |
| 4,357,775 | A * | 11/1982 | Click | 43/43.15 |
| 4,418,492 | A * | 12/1983 | Rayburn | 43/44.9 |
| 4,453,336 | A * | 6/1984 | Lowden | 43/43.12 |
| 4,458,439 | A * | 7/1984 | Garrett, Sr. | 43/44.87 |
| 4,472,903 | A * | 9/1984 | Hutson | 43/44.91 |
| 4,528,771 | A * | 7/1985 | Rea, Jr. | 43/44.9 |
| 4,610,104 | A * | 9/1986 | Garcia | 43/44.9 |
| 4,644,681 | A * | 2/1987 | Hutson | 43/44.91 |
| 4,656,776 | A * | 4/1987 | Macachor | 43/44.88 |
| 4,696,124 | A * | 9/1987 | Wille | 43/43.12 |
| 4,696,125 | A * | 9/1987 | Rayburn | 43/43.15 |
| 4,845,884 | A * | 7/1989 | Pacitti | 43/44.88 |
| 4,920,689 | A * | 5/1990 | Anderson | 43/43.13 |
| 5,243,780 | A * | 9/1993 | Christensen | 43/44.87 |
| 5,274,945 | A * | 1/1994 | Ross | 43/44.91 |
| 5,347,745 | A * | 9/1994 | Authement | 43/44.91 |
| 5,377,444 | A * | 1/1995 | Gibney, Sr. | 43/44.91 |
| 5,398,440 | A * | 3/1995 | Amundsen | 43/44.87 |
| 5,404,668 | A * | 4/1995 | Christensen | 43/44.87 |
| 5,555,668 | A * | 9/1996 | Brasseur | 43/43.15 |
| 5,608,985 | A * | 3/1997 | Kainec | 43/44.87 |
| 5,636,467 | A * | 6/1997 | Adams | 43/43.13 |
| 5,887,381 | A * | 3/1999 | Stephenson | 43/44.87 |
| 6,009,659 | A * | 1/2000 | Shannon et al. | 43/44.87 |
| 6,192,619 | B1 * | 2/2001 | Pirkle | 43/43.12 |
| 6,237,276 | B1 * | 5/2001 | Storelli | 43/43.15 |
| 6,247,263 | B1 * | 6/2001 | Tiede et al. | 43/44.88 |
| 6,574,910 | B1 * | 6/2003 | Verdura Pares | 43/44.88 |
| 6,708,442 | B2 * | 3/2004 | Kress et al. | 43/44.9 |
| 6,745,511 | B1 * | 6/2004 | Falconer | 43/44.87 |
| 6,955,005 | B2 * | 10/2005 | Storelli | 43/43.15 |
| 6,966,139 | B2 * | 11/2005 | Izzard | 43/44.9 |
| 7,162,830 | B2 * | 1/2007 | Sims | 43/44.87 |
| 7,415,792 | B1 * | 8/2008 | Noble | 43/44.87 |
| 2006/0070291 | A1 * | 4/2006 | Pomeroy | 43/44.87 |
| 2008/0040966 | A1 * | 2/2008 | Stone et al. | 43/43.15 |

FOREIGN PATENT DOCUMENTS

| | | | |
|---|---|---|---|
| FR | 2617011 A1 | * | 12/1988 |
| JP | 06153748 A | * | 6/1994 |
| JP | 06205630 A | * | 7/1994 |
| JP | 09056312 A | * | 3/1997 |
| JP | 09172923 A | * | 7/1997 |
| JP | 10113110 A | * | 5/1998 |
| JP | 10276643 A | * | 10/1998 |
| JP | 2000125729 A | * | 5/2000 |
| JP | 2002027881 A | * | 1/2002 |
| JP | 2003092961 A | * | 4/2003 |
| JP | 2004158209 A | * | 6/2004 |
| JP | 2005058077 A | * | 3/2005 |
| JP | 2006025716 A | * | 2/2006 |
| JP | 2006288274 A | * | 10/2006 |
| WO | WO 9300802 A1 | * | 1/1993 |

* cited by examiner

BOBBER INCORPORATING FISHING LINE HANDLING ASSEMBLY

FIELD OF THE INVENTION

The invention relates generally to bobbers, and more particularly to a bobber that incorporates a fishing line handling assembly having a downrigger release at one end of the bobber and a snap clip at the other end of the bobber.

BACKGROUND OF THE INVENTION

Bobbers are used by fishermen to hold bait on a hook at a certain depth in the water. Typically, a bobber includes a float that includes means for attaching the float to a fishing line. The fishing line extends to a baited hook at a selected water depth. When the fish bites on the baited hook and starts to swim away, the bobber's float moves along the water's surface. If the fish is large enough, it can dive down and pull the float underwater. However, the buoyant forces acting on the bobber's float can cause the hook to be "sling shot" out of the fish's mouth causing the "catch" to be lost.

SUMMARY OF THE INVENTION

Accordingly, it is an object of the present invention to provide a fishing bobber.

Another object of the present invention is to provide a fishing bobber the remains securely coupled to a fishing line at the water's surface before, during and after the time that a fish bites on a hooked line coupled to the bobber.

Other objects and advantages of the present invention will become more obvious hereinafter in the specification and drawings.

In accordance with the present invention, a bobber includes a float and a fishing line handling assembly. The float has a passage extending therethrough from a first end of the float to a second end of the float. The fishing line handling assembly is fitted in the passage. The assembly is terminated at one end thereof by a downrigger release that extends from the passage at the first end of the float. The assembly is terminated at an opposing end thereof by a snap clip that extends from the passage at the second end of the float. The snap clip receives and loosely holds a fishing line therein while the downrigger release holds the fishing line securely therein until a sufficient tension develops in the fishing line, e.g., when a fish bites on a hook attached to the fishing line.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
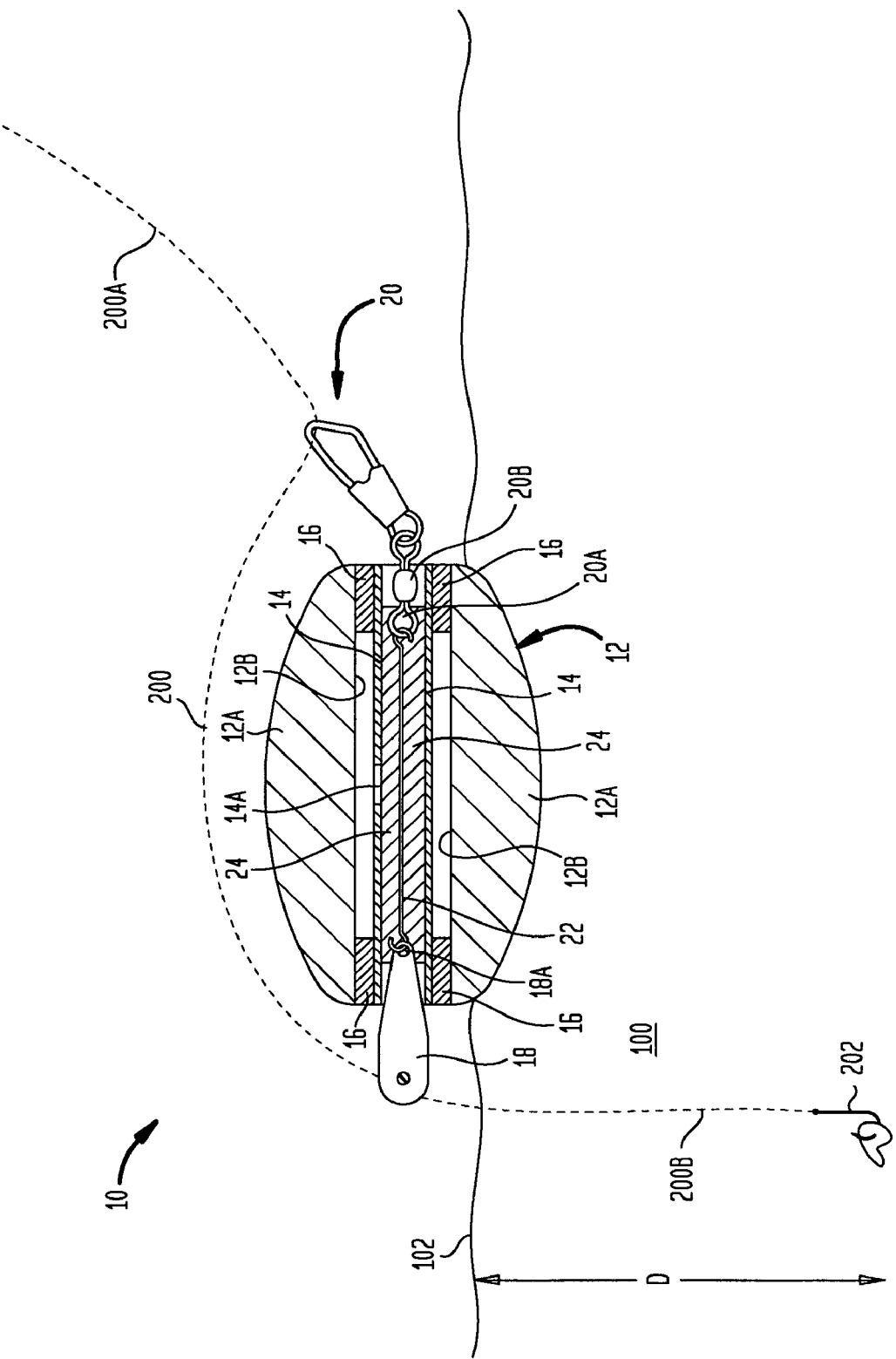
FIG. 1 is a partial cross-sectional view and a partial side view of a fishing bobber in accordance with an embodiment of the present invention.

Referring now to the drawings and more particularly to FIG. 1, a bobber in accordance with an embodiment of the present invention is shown and is referenced generally by numeral 10. Bobber 10 is shown floating on the surface 102 of a body of water 100 with a fishing line 200 being coupled thereto. Fishing line 200 is illustrated in dashed line form to indicate that it is not part of the present invention and is not a limitation thereon. One end 200A of fishing line 200 extends to a fishing pole (not shown) and the other end 200B terminates at a baited hook 202. As will be explained further below, bobber 10 facilitates the positioning of bated hook 202 at a selected depth D beneath surface 102.

Bobber 10 includes a float 12 that can be a conventional rope float as depicted in the illustrated embodiment. That is, float 12 has an oblong body 12A that is configured to define a passage 12B all the way through the central portion of body 12A. Body 12A can be made of solid foam or other floatable material. However, as would be understood in the art, body 12A could also be a hollow body without departing from the scope of the present invention.

Fitted in passage 12B is an assembly that provides the elements for handling fishing line 200. More specifically, the assembly includes a rigid tube 14 that extends along the length of passage 12B. Tube 14 can be sized to form a press-fit engagement with passage 12B, or can be diametrically smaller than passage 12B in which case one or more spacers or shims 16 can be positioned between tube 14 and passage 12B. For example, shims 16 can be elastomeric rings or cylinders designed to fit over tube 14 and engage the walls of passage 12B.

In general, tube 14 supports a downrigger 18 and a snap clip 20 such that the functional portions thereof extend from opposing ends of float body 12A. More specifically, a portion downrigger 18 resides in one end of tube 14 and a portion of snap clip 20 resides in the other end of tube 14. Downrigger 18 and snap clip 20 are coupled to one another by a rigid connecting rod 22 as one end of connecting rod 22 loops through a hole 18A in downrigger 18 and the other end of connecting rod 22 loops through a connection ring 20A of snap clip 20. The arrangement of downrigger 18, snap clip 20 and connecting rod 22 is held in place in tube 14 by means of a fill material 24 that bonds to the arrangement as well as the inside walls of tube 14. Typically, this arrangement is placed in tube 14 prior to the placement of fill material 24. By way of non-limiting examples, fill material 24 can be a variety of glues, foams or other curable materials that can be injected into tube 14 in an uncured state thereof once downrigger 18, snap clip 20 and connecting rod 22 are positioned in tube 14. To facilitate the filling of tube 14 while keeping downrigger 18 and snap clip 20 free of fill material 24, a fill hole 14A can be provided in a side wall of tube 14.

Downrigger 18 is any of a variety of conventional downriggers that can hold fishing line 200 until a prescribed line tension causes fishing line 200 to be released therefrom. Snap clip 20 is any of a variety of snap clips that can be quickly opened/closed to allow a fisherman to capture fishing line 200 loosely therein. Although not required, snap clip 20 can incorporate a swivel 20B to permit free and full rotation of snap clip 20 relative to float 12.

In use of bobber 10, snap clip 20 is opened to receive fishing line 200 therein. Fishing line 200 is then captured in downrigger 18 as shown so that a selected amount of fishing line 200 extends to baited hook 202. When a fish bites on baited hook 202 and begins to swim away, the tension in fishing line 200 will cause line 200 to be released from downrigger 18. Once this happens, line 200/hook 202 runs with the fish. However, since fishing line 200 is only loosely captured in snap clip 20, float 12 remains at the surface 102 of water 100. Thus, the present invention prevents float 12 from being pulled underwater no matter what size fish bites on baited hook 202.

Figure 2:
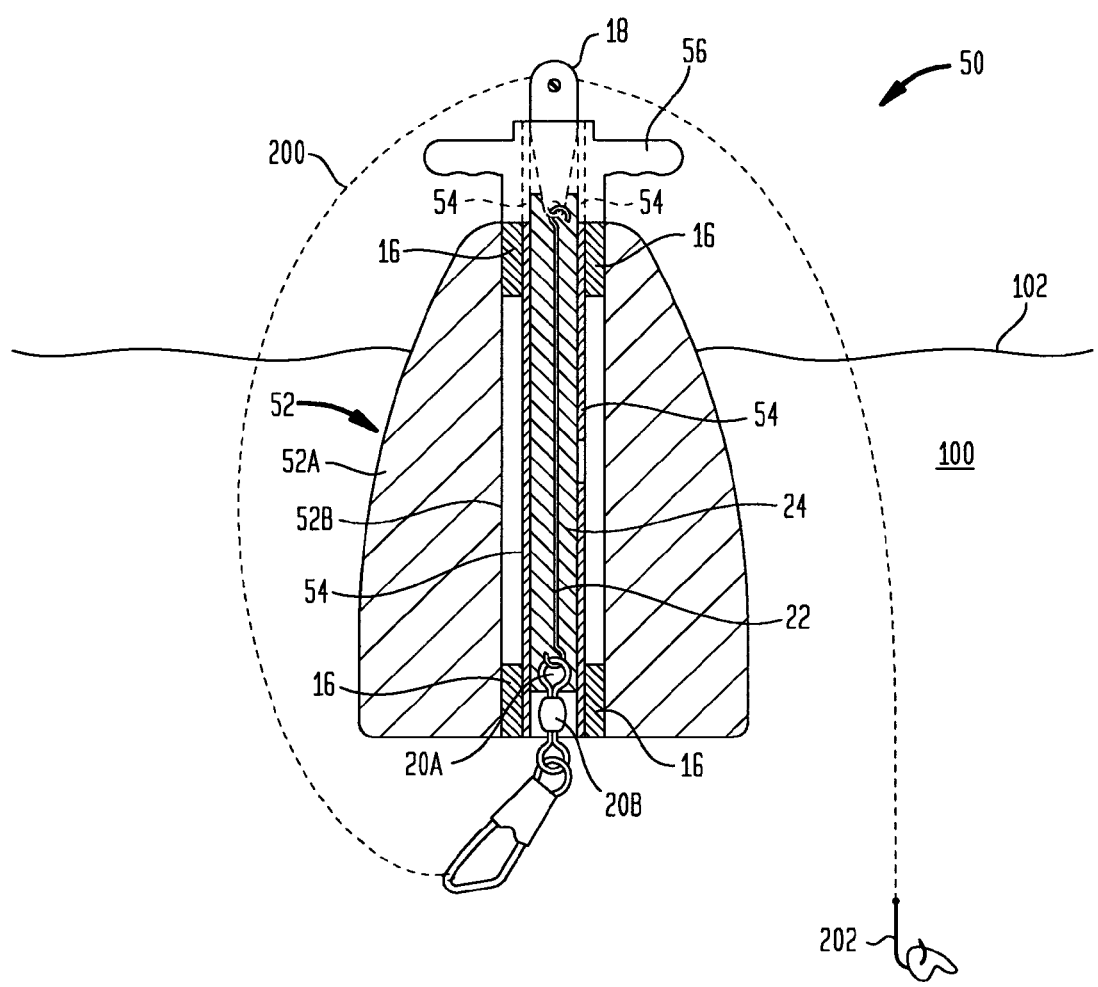
FIG. 2 is a partial cross-sectional view and partial side view of a fishing bobber in accordance with another embodiment of the present invention.

The present invention can also be adapted for use in jugline fishing (e.g., method used when fishing for catfish). A bobber configured for jugline fishing is illustrated in FIG. 2 and is referenced generally by numeral 50. In FIG. 2, the same reference numerals are used for elements that are common with bobber 10. Such elements will not be described further herein.

Bobber 50 includes float 52 that is a conventional buoy float designed to float in a vertical orientation relative to the surface 102 of water 100 as is known in the art. That is, float 52 has a shaped body 52A that defines a passage 52B all the way through a central longitudinal portion of body 52A. As with float 12, float 52 can be made of foam or other floatable material, but can also be a hollow body without departing from the scope of the present invention.

Fitted in passage 52B is an assembly that provides for the handling of fishing line 200 and provides for the manual retrieval of bobber 50 from the surface 102 of water 100. More specifically, the assembly includes a rigid tube 54 that is longer than passage 52B such that tube 54 extends from float 52 at the top end thereof as shown. As in the previous embodiment, tube 54 supports downrigger 18, snap clip 20, connecting rod 22 and fill material 24. In addition, mounted on the portion of tube 54 that extends from float 52 is a T-shaped handle 56 that facilitates the placement and retrieval of bobber 50.

In use of bobber 50, fishing line 200 is fixedly coupled (e.g., tied on) to snap clip 20 and captured in downrigger 18. The portion of fishing line 200 between downrigger 18 and snap clip 20 defines a desired amount of slack with which a fish can run once baited hook 202 is bit on and the tension in fishing line 200 causes line 200 to be released from downrigger 18.

The advantages of the present invention are numerous. The "fishing line" bobber embodiment will remain at the water's surface and thereby eliminating the "sling shot" effect regardless of the size of the fish that bites on the baited hook. Attachment of the bobber to a fishing line is quick and the positioning thereof for hook depth is easily adjusted. The "jugline" bobber is similarly configured to provide simple, adjustable and efficient placement, use and retrieval.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A bobber comprising:
  a float having a passage extending therethrough from a first end of said float to a second end of said float; and
  a fishing line handling assembly fitted in said passage, said assembly terminated at one end thereof by a downrigger release that extends from said passage at said first end of said float, said assembly terminated at an opposing end thereof by a snap clip that extends from said passage at said second end of said float, said snap clip being adapted to receive and loosely hold a fishing line therein, said assembly further comprises:
    housing means forming press-fit engagement with said passage; and
    positioning means disposed in said housing means for positioning said downrigger release and said snap clip, said positioning means comprises:
      a rigid connector coupling said downrigger release to said snap clip; and
      said rigid connector being fixed within said housing means such that said rigid connector cannot move within said housing means in a direction parallel to a longitudinal axis of said housing means.

2. A bobber as in claim 1 wherein said float is selected from the group consisting of a rope float and a buoy float.

3. A bobber as in claim 1 where said assembly further includes a handle positioned between said downrigger release and said first end of said float.

4. A bobber as in claim 1 wherein said positioning means comprises:
  said rigid connector being fixed within said housing means by a fill material encasing said rigid connector and bonded to internal walls of said housing means.

5. A bobber as in claim 1 wherein said housing means comprises:
  a hollow tube extending the length of said passage; and
  at least one shim disposed between said tube and said passage to create said press-fit engagement.

6. A bobber as in claim 1 wherein said snap clip includes a swivel.

7. A bobber comprising:
  a float having a passage extending centrally therethrough from a first end of said float to a second end of said float;
  a tubular housing fitted in said passage and extending at least a length thereof;
  a downrigger release;
  a snap clip; and
  means positioned in said housing for rigidly connecting said downrigger release to said snap clip such that said downrigger release extends from said first end of said float and said snap clip extends from said second end of said float, said snap clip being adapted to receive and loosely hold a fishing line therein, wherein said means for rigidly connecting comprises:
    a rigid connector coupling said downrigger release to said snap clip, said rigid connector being fixed within said tubular housing such that said rigid connector cannot move within said tubular housing in a direction parallel to a longitudinal axis of said tubular housing.

8. A bobber as in claim 7 wherein said float comprises a rope float.

9. A bobber as in claim 7 wherein said float comprises a buoy float.

10. A bobber as in claim 9 where said tubular housing further includes a T-shaped handle positioned between said downrigger release and said first end of said float.

11. A bobber as in claim 7 wherein said means for rigidly connecting comprises:
  said rigid connector being fixed within said tubular housing by a fill material encasing said rigid connector and bonded to internal walls of said housing.

12. A bobber as in claim 11 wherein said housing has a hole in a side wall thereof for receiving said fill material therethrough in an uncured state.

13. A bobber as in claim 7 wherein said housing comprises:
  a hollow tube extending the length of said passage; and
  at least one shim disposed between said tube and said passage to create a press-fit engagement with said passage.

14. A bobber as in claim 7 wherein said snap clip includes a swivel.

15. A bobber comprising:

a float having a passage extending centrally therethrough from a first end of said float to a second end of said float;

a rigid and hollow open-ended tube fitted in said passage and extending at least a length thereof, said tube having a hole formed therethrough in a side wall thereof;

a downrigger release;

a swivel snap clip;

a rigid connector positioned in said housing connecting said downrigger release to said swivel snap clip in a spaced apart fashion wherein said downrigger release extends from said first end of said float and said swivel snap clip extends from said second end of said float; and a cured fill material encasing said rigid connector and bonded to internal walls of said tube, said cured fill material being injected into said tube via said hole when said cured fill material is in an uncured state.

16. A bobber as in claim 15 wherein said float comprises a rope float.

17. A bobber as in claim 15 wherein said float comprises a buoy float.

18. A bobber as in claim 17 where said tube further includes a T-shaped handle positioned between said downrigger release and said first end of said float.

19. A bobber as in claim 15 further comprising at least one shim disposed between said tube and said passage.

* * * * *